United States Patent [19]
Arnold et al.

[11] 4,111,456
[45] Sep. 5, 1978

[54] INDEPENDENT STRUT TYPE SUSPENSION ASSEMBLIES FOR VEHICLES

[75] Inventors: Willi Arnold, Nauheim; Rolf Pflughaupt, Rüsselsheim; Bertold Felzer, Mainz, all of Germany Germany

[73] Assignee: General Motors Corporation, Detroit, Mich.

[21] Appl. No.: 805,113

[22] Filed: Jun. 9, 1977

[30] Foreign Application Priority Data

Jun. 12, 1976 [DE] Fed. Rep. of Germany ....... 2626392

[51] Int. Cl.² .......................................... B62D 17/00
[52] U.S. Cl. .................................. 280/692; 267/64 B
[58] Field of Search ............... 280/690, 692, 693, 696, 280/702, 709; 267/64

[56] References Cited

U.S. PATENT DOCUMENTS

| 2,980,441 | 4/1961 | Timpner | 280/693 |
| 3,941,401 | 3/1976 | Allison | 280/692 |

Primary Examiner—Philip Goodman
Attorney, Agent, or Firm—John P. Moran

[57] ABSTRACT

An independent strut type suspension assembly for a vehicle including a hydraulic telescopic damper having a housing to the lower end of which is secured a wheel carrier for a road wheel of the vehicle. A lower transverse pivotal guide member is articulated to the wheel carrier and to part of the body of the vehicle. A piston rod of the damper projects from the housing and extends through an aperture in the vehicle body, and the upper end portion of the piston rod is rigidly connected to connector means including a bell-shaped member the open end portion which has a resilient connection, in the form of an annular rubber member, to the vehicle body.

A helical wheel-suspension spring surrounds the damper, with the lower end of the spring seated on the damper housing.

To facilitate disassembly of the damper, even when the wheel is loaded, a releasable connection is provided for at least a part of the bell-shaped member, and provides on release thereof an opening permitting removal of parts of the damper through the opening, the upper end of the wheel-suspension spring being seated externally of such parts as have to be removed for disassembly of the damper.

To provide the releasable connection, the bell-shaped member may be of two-part construction, for example with a bayonet connection between the two parts. Alternatively, the annular rubber member may be retained by a releasable apertured clamp plate, for example secured by screws.

7 Claims, 3 Drawing Figures

U.S. Patent
Sept. 5, 1978
4,111,456
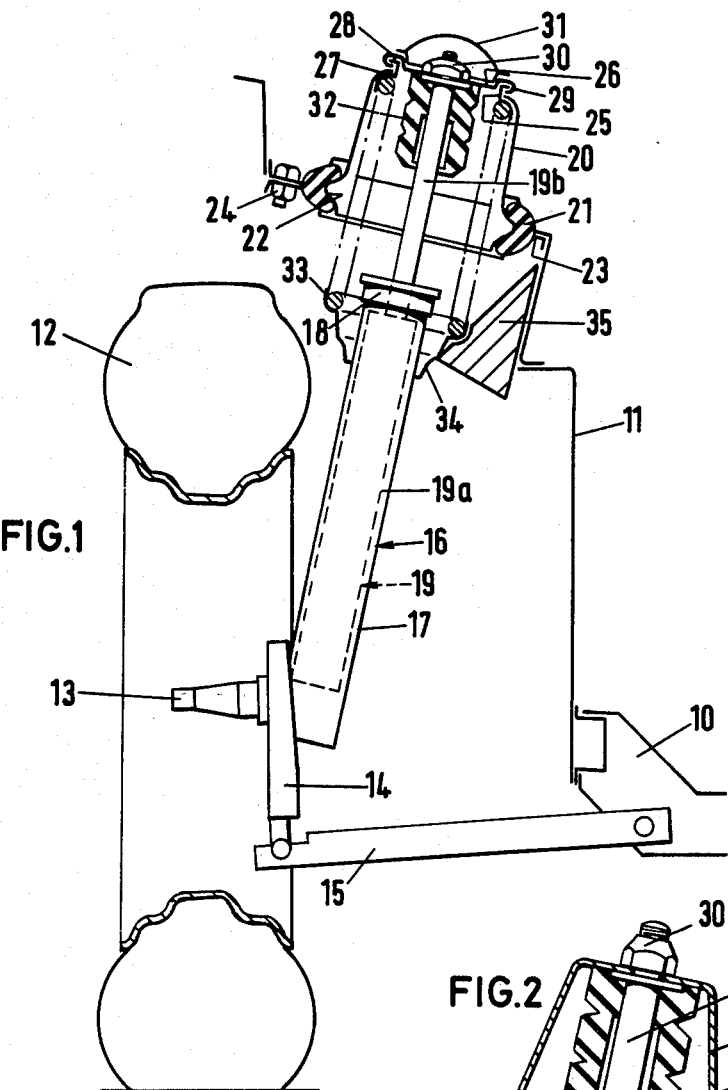
FIG.1
FIG.2
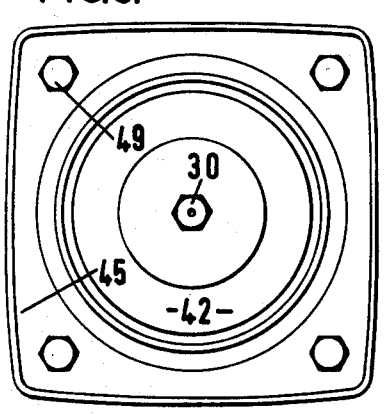
FIG.3.

INDEPENDENT STRUT TYPE SUSPENSION ASSEMBLIES FOR VEHICLES

This invention relates to independent strut type suspension assemblies for vehicles.

The present invention takes as its starting point an independent strut type suspension assembly for a vehicle comprising a rectilinear guide member in the form of a hydraulic telescopic damper having a housing portion which is rigidly connected at its lower end to a wheel carrier, and a piston rod which projects through an opening in the vehicle superstructure, and also comprising a lower transverse pivotal guide member, and, forming a pivotal connection between the upper end of the piston rod of the telescopic damper and the vehicle superstructure, a bell-shaped intermediate member which is rigidly connected to the upper end of the piston rod of the telescopic damper and at a downwardly open end thereof is resiliently supported by the vehicle superstructure at a position below the upper end of the telescopic damper.

The particular advantage of such an arrangement is a reduction in the transverse force which arises at the upper support point of the telescopic damper because the line of application of the wheel force is offset from the damper axis. Reduction of this transverse force reduces the bearing and frictional forces between the damper tube and the damper piston and piston rod, so reducing bending deflection of the piston rod in the region of the piston rod guide.

The resulting decreased bearing forces between the sliding parts inside the damper permit improved response, such that even quite small forces may be effectively damped.

The object of the present invention is to avoid difficulties involved in the dismantling or replacement of the telescopic damper, even when the wheel is loaded, in an assembly as aforesaid in which the telescopic damper, for the purpose of forming a resilient suspension strut, is surrounded by a helical wheel-suspension spring.

For achieving this object, in an independent strut type suspension assembly in accordance with the present invention there is a releasable connection for at least a part of the intermediate member, to provide on release of the connection an aperture permitting removal of parts of the telescopic damper therethrough for disassembly of the telescopic damper, and a helical wheel-suspension spring surrounds the telescopic damper with one end of the spring seated on the housing portion of the telescopic damper and the other end of the spring seated externally of such parts as have to be removed for disassembly of the telescopic damper.

Thereby, dismantling (disassembly) of the telescopic damper may be achieved without unloading of the wheel.

In one form of construction in conformity with the present invention, the piston rod of the telescopic damper is rigidly connected to a plate-like component that is releasably connected to a rim portion surrounding an aperture as aforesaid which is formed in a base portion of the intermediate member and has a diameter larger than that of the damper tube of the telescopic damper, and the helical wheel-suspension spring is seated at the said other end thereof in the base portion of the intermediate member, independently of the connection provided by the intermediate member between the piston rod of the telescopic damper and the vehicle superstructure.

With this form of construction, both the telescopic damper and the wheel-suspension spring are supported in the bell-shaped intermediate member, which is itself mounted in the opening in the vehicle superstructure through the intermediary of a resilient element. The result is that not only the wheel forces but also the forces originating from the telescopic damper must be resiliently absorbed by this single resilient element (for example, C-section rubber ring).

On the other hand, another form of construction in accordance with the present invention is possible, to provide a completely uncoupled support of the telescopic damper and of the wheel-suspension spring, in which the intermediate member is releasably connected at the open end thereof to the vehicle superstructure by means of a releasable annular (apertured) clamp, and the helical wheel-suspension spring is seated at the said other end thereof on the vehicle superstructure at a location externally of the intermediate member. In this case the bell-shaped intermediate member can be made in one piece. Then, for the purpose of dismantling the telescopic damper, the bell-shaped intermediate member can be secured in the corresponding opening in the vehicle superstructure so as to be releasably and upwardly withdrawable. This can be achieved by arranging that, at its lower edge, the bell-shaped intermediate member is provided with an outwardly directed annular bead, and with the interposition of a rubber ring, this bead is resiliently supported in an inwardly open channel formed from the rim of an opening in a portion of the vehicle superstructure and by a stamping (constituting the plate-like component) which is positioned over the bead, and retained by screws.

For the support of the telescopic damper and wheel-suspension spring uncoupled in this way, it is of advantage if, in conformity with a further preferred feature of the present invention, the wheel-suspension spring is formed as a frusto-conical spring with the diameter of its convolutions widening in the upward direction. In this way it is possible to allow adequate movement of the spring even when the height available for installing the spring is restricted.

The appended claims define the scope of the invention claimed.

The invention and how it can be performed are hereinafter particularly described with reference to the accompanying drawing, in which:

FIG. 1 is a schematic representation, looking in the longitudinal direction of a vehicle, of a preferred embodiment of a motor vehicle independent wheel suspension in accordance with the present invention, with a wooden wedge inserted for disassembly of a hydraulic telescopic damper forming part of the wheel suspension;

FIG. 2 is a fragmentary view illustrating another form of upper support for a resilient suspension strut forming part of a motor vehicle independent wheel suspension in accordance with the present invention; and FIG. 3 is a plan of the upper support for the resilient suspension strut shown in FIG. 2.

In FIG. 1 of the drawing, a wheel housing forming a part of a vehicle superstructure 10 is designated by reference numeral 11. A road wheel 12 is rotatably mounted on a stub axle 13 which forms part of a steering knuckle 14 constituting a wheel carrier. The steering knuckle 14 — and therefore the road wheel 12 — is mounted on the vehicle superstructure 10 by means of a lower transverse pivotal link 15, in conjunction with a rectilinear guide member in the form of a resilient suspension strut 16. Rigidly connected to the steering knuckle 14 there is a protective tube 17 which accommodates the entire damper tube 19a of a hydraulic telescopic damper 19, and constitutes a housing portion for the hydraulic telescopic damper. The damper tube 19a is secured to the upper edge of the protective tube 17 by means of a ring nut 18. Only a piston rod 19b of the telescopic damper 19 projects from the protective tube 17: the piston rod 19b projects through an opening in the vehicle superstructure, and is rigidly connected to the base portion of a downwardly open bell-shaped intermediate member 20.

To establish a resilient connection to the vehicle superstructure 10, at a position below the upper end of the telescopic damper, the bell-shaped intermediate member 20 is provided at the edge of its downwardly open end with an outwardly directed annular bead 22 by means of which it is held in a corresponding inwardly open channel with the interposition of a C-section rubber ring 21. The upper part of the channel is formed by appropriate configuration of the edge of the opening in the vehicle superstructure, and the lower part of the channel is formed by a stamping 23 which, at various places on its periphery, is secured to the wheel housing 11 by means of screwed connections 24. The elasticity of the rubber ring 21 ensures adequate angular (pivotal) mobility of the damper support, such movement being necessary for kinematic reasons.

The base portion of the bell-shaped intermediate member 20 consists of two parts, namely an annular part 25 and a plate-like component constituted by a central cover plate 26. The annular part 25 has a substantially S-shaped cross-section, having an upwardly directed inner limb and a downwardy directed outer limb, and bears against the inner surface of the bell-shaped intermediate member at an inturned rim portion 27 of the intermediate member. The upwardly directed limb of the annular part 25 is bent over to form an outwardly directed annular flange 28, which forms a releasable bayonet connection on conjunction with a 180° return-bend portion of the outer peripheral region 29 of the cover plate 26, recesses (not shown), forming part of the releasable bayonet connection, being provided in the outer peripheral region 29 of the cover plate 26 and in the annular flange 28 (this annular flange 28 constituting a rim portion surrounding the central aperture in the annular part 25). Also, stops and catch devices of known form are provided to secure the two parts 26 and 28 of the bayonet connection.

The cover plate 26 has a central bore through which a threaded reduced-diameter end portion of the piston rod 19 passes and is rigidly connected to the cover plate by means of a nut 30. The central region of the cover plate 26 is recessed so that it provides a vertical wall portion into which a protective cap is press-fitted. Below the cover plate 29, a rubber buffer 32 is secured to the piston rod 19 to form a resilient bump stop.

A wheel-suspension spring for the wheel 12 is constituted by a helical spring 33 which coaxially surrounds the telescopic damper and the protective tube 17. The lower end of the spring 33 is seated on a lower spring plate 34 secured to the protective tube 17 constituting the housing portion for the telescopic damper, and the upper end of the spring is seated on the annular part 25 of the base portion of the bell-shaped intermediate member 20, thereby holding the annular part 25 in rigid engagement with the inturned rim portion 27 of the intermediate member. Accordingly, both the spring forces and the damper forces are fed into the bell-shaped intermediate member 20, which is itself resiliently connected to the wheel housing 11 by way of the rubber ring 21.

FIG. 1 also shows a wooden wedge 35 which, for dismantling (disassembly) of the damper without the need for relieving the load on the wheel 12, is introduced between the inner part of the wheel housing 11 and the lower spring plate 34 (or the protective tube 17), so preventing the steering knuckle 14 from pivoting about the articulation point to the lower transverse pivotal link 15 as a consequence of the wheel stand-off force acting eccentrically with respect to the wheel-suspension spring axis.

After insertion of the wooden wedge 35, dismantling of the damper is a simple matter. After removal of the protective cap 31, it is merely necessary to release the central support plate 26 by twisting it, thereby giving free access to the ring nut 18. After unscrewing of the ring nut 18 by way of the central aperture in the annular part 25, made accessible by removal of the central support plate 26, the damper can be withdrawn from the protective tube 17 and removed through this aperture in the base portion of the bell-shaped intermediate member 20.

The resilient suspension strut shown in FIG. 2 utilises a wheel-suspension spring 41 which is seated externally of the bell-shaped intermediate member 42. Thereby, the damper and the wheel-suspension spring can be supported separately, with the advantage that the spring forces and the damper forces are transmitted to the vehicle superstructure without mutual influence, and through separate rubber elements. In the FIG. 2 embodiment, the piston rod 19b of the telescopic damper 19 is rigidly connected to the base portion of a downwardly open bell-shaped intermediate member 42 by means of a nut 30. The intermediate member 42 is provided at its bottom edge with an outwardly directed annular bead 43 which, to provide a resilient connection between the intermediate member 42 and the wheel housing 44, is supported with the interposition of a rubber ring 46 in an inwardly open channel formed from the rim of the opening and a plate-like component constituted by a stamping 45 that is secured over the annular bead and rubber ring by means of four screws 49.

A rubber buffer 32 is secured to the upper end portion of the piston rod 19 to form a resilient bump stop limiting in-springing movement.

A frusto-conical helical spring 41 with the diameter of its convolutions increasing in upward direction is provided as the wheel-suspension spring. The lower end of the spring 41 is seated on a spring plate 47 secured to the protective tube 17, and the upper, wider end of the spring is seated against a wheel arch housing portion 44 of the vehicle superstructure, externally of the bell-shaped intermediate member 42, with an annular rubber cushion 48 being interposed for the purpose of damping and noise insulation.

Dismantling of the telescopic damper can be carried out as easily as with the first embodiment. After insertion of a clamping wedge similar to wedge 35 illustrated in FIG. 1, the four screws 49 securing the stamping 45 are released. Thereupon, the piston rod 19 can be withdrawn from the damper sufficiently for the ring nut 18 to become accessible. After release of the ring nut 18, the damper can then be dismounted upwardly. As before, it is not necessary to relieve the wheel from load, because support of the wheel by its spring has not been nullified.

If there is non-rotatable support of the wheel-suspension spring at the lower spring plate and at the vehicle superstructure, when steering lock is applied some twisting of the wheel-suspension spring takes place. By appropriate dimensioning of the spring convolutions, however, the resulting restoring force can be kept within permissible limits. Should the restoring force exceed a desired amount, it may be reduced considerably by the fitting of a bearing.

What is claimed is:

1. An independent strut type suspension assembly for a vehicle having a body with an aperture formed therein, said assembly comprising a telescopic damper including a housing having a piston rod telescopically mounted therein and projecting through said aperture, a wheel carrier secured to the lower end of said housing and having a wheel rotatably mounted thereon, a lower transverse pivotal guide member for said wheel carrier, and connector means connected between the upper end portion of said piston rod and said vehicle body, said connector means including a bell-shaped member secured to said upper end portion of said piston rod, and an annular rubber member retained between the open end portion of the bell-shaped member and the edge region of said aperture in said vehicle body, releasable connection means for at least a part of said bell-shaped member, providing on release of said connection means an opening permitting removal of parts of said damper therethrough for disassembly of said damper, and a helical wheel-suspension spring surrounding said damper with one end of said spring seated on said housing and the other end of said spring seated externally of such parts as have to be removed for disassembly of said damper.

2. An independent strut type suspension assembly for a vehicle having a body with an aperture formed therein, said assembly comprising a telescopic damper including a housing having a piston rod telescopically mounted therein and guided through said aperture by a guide member secured within the upper end of said housing, a wheel carrier secured to the lower end of said housing and having a wheel rotatably mounted thereon, a lower transverse guide member pivotally connected to said wheel carrier and to said body, and connector means connected between the upper end portion of said piston rod and said vehicle body, said connector means including a bell-shaped member secured to said upper end portion of said piston rod and having an annular bead formed on the open end portion thereof, an inwardly widening annular channel formed around the edge of said aperture adjacent said annular bead, and an annular rubber member retained between said channel and said annular bead, said guide member being movable relative to said connector means in response to road impact loads on said wheel from a freestanding position a predetermined distance below the plane of said annular bead to a maximum impact load position a predetermined distance above said plane of said annular bead, the transverse forces on said piston rod being minimal when said guide member is positioned along said plane of said annular bead, releasable connection means for at least a part of said bell-shaped member, providing on release of said connection means an opening permitting removal of parts of said damper therethrough for disassembly of said damper, and a helical wheel-suspension spring surrounding said damper with one end of said spring seated on said housing and the other end of said spring seated externally of such parts as have to be removed for disassembly of said damper.

3. An independent strut type suspension assembly for a vehicle having a body with an aperture formed therein, said assembly comprising a telescopic damper including a housing having a piston rod telescopically mounted therein and guided through said aperture by a guide member secured within the upper end of said housing, a wheel carrier secured to the lower end of said housing and having a wheel rotatably mounted thereon, a lower transverse pivotal guide member for said wheel carrier, a plate member rigidly connected to the upper end portion of said piston rod, a bell-shaped member surrounding said piston rod, said bell-shaped member having a base portion formed with a central opening and also having an open end portion formed with an annular bead, an inwardly widening annular channel formed around the edge of said aperture and straddling said annular bead, and an annular rubber member retained within said channel by said annular bead, means releasably connecting said plate member to a rim portion surrounding said central opening, said opening having a diameter larger than that of said housing, and a helical wheel-suspension spring having one end seated on said housing and another end seated within said base portion.

4. An independent strut type suspension assembly for a vehicle having a body with an aperture formed therein, said assembly comprising a telescopic damper including a housing having a piston rod telescopically mounted therein and guided through said aperture by a guide member secured within the upper end of said housing, a wheel carrier secured to the lower end of said housing and having a wheel rotatably mounted thereon, a lower transverse pivotal guide member for said wheel carrier, a plate member rigidly connected to the upper end portion of said piston rod, a bell-shaped member surrounding said piston rod, said bell-shaped member having a base portion formed with a central opening and also having an open end portion formed with an annular bead, an inwardly widening annular channel formed around the edge of said aperture and straddling said annular bead, and an annular rubber member retained within said channel by said annular bead, bayonet connection means releasably connecting said plate member to a rim portion surrounding said central opening, said opening having a diameter larger than that of said housing, and a helical wheel-suspension spring having one end seated on said housing and another end seated within said base portion.

5. An independent strut type suspension assembly for a vehicle having a body with an aperture formed therein, said assembly comprising a telescopic damper including a housing having a piston rod telescopically mounted therein and guided through said aperture by a guide member secured within the upper end of said housing, a wheel carrier secured to the lower end of said housing and having a wheel rotatably mounted thereon, a lower transverse pivotal guide member for said wheel carrier, and connector means connected between the upper end portion of said piston rod and said vehicle body, said connector means including a bell-shaped member secured to said upper end portion of said piston rod and having an annular bead formed on the open end portion thereof, a clamp plate releasably secured to a rim of said aperture and forming with said rim an inwardly widening annular channel around the edge of said aperture and straddling said annular bead, and an annular rubber member retained within said channel by said annular bead, said aperture having a diameter larger than that of said housing, and a helical wheel-suspension spring having one end seated on said housing and another end seated on said body at a location externally of said bell-shaped member.

6. An independent strut type suspension assembly according to claim 5, in which said helical wheel-suspension spring is of frusto-conical form with the diameter of its convolutions widening in the upward direction.

7. An independent strut type suspension assembly according to claim 5, in which a buffer is secured to the upper end of said piston rod within said bell-shaped member.

* * * * *